United States Patent [19]
Tani et al.

[11] Patent Number: 5,619,532
[45] Date of Patent: Apr. 8, 1997

[54] DIGITAL COMMUNICATION SYSTEM

[75] Inventors: Shigeo Tani; Katsuaki Yamanaka; Hironori Aono; Toshiaki Kinoshita, all of Osaka, Japan

[73] Assignee: Fujitsu Limited, Kanagawa, Japan

[21] Appl. No.: 488,250

[22] Filed: Jun. 7, 1995

[30] Foreign Application Priority Data

Sep. 5, 1994 [JP] Japan ................................ 6-211555

[51] Int. Cl.⁶ .................................................. H04B 3/46
[52] U.S. Cl. ........................... 375/224; 375/225; 370/241
[58] Field of Search ................................. 375/224, 225, 375/228, 358; 455/69, 71; 370/13

[56] References Cited

U.S. PATENT DOCUMENTS

| | | | |
|---|---|---|---|
| 4,991,184 | 2/1991 | Hashimoto | 375/358 |
| 5,245,633 | 9/1993 | Schwartz et al. | 375/267 |
| 5,253,270 | 10/1993 | Petit | 375/301 |

FOREIGN PATENT DOCUMENTS

| | | |
|---|---|---|
| 59-168776 | 9/1984 | Japan . |
| 61-94426 | 5/1986 | Japan . |
| 61-218269 | 9/1986 | Japan . |
| 4-286440 | 10/1992 | Japan . |
| 4-335736 | 11/1992 | Japan . |
| 5-199277 | 8/1993 | Japan . |

*Primary Examiner*—Stephen Chin
*Assistant Examiner*—T. Ghebretinsae

[57] ABSTRACT

A digital communication system includes a first station, a second station and a network therebetween. The first station includes a clock selecting device for selecting one clock from a plurality of different clocks; and a transmitting device for transmitting frames to the second station based on the selected clock. The second station includes an evaluating device for evaluating transmission quality of data in each of the frames received from the first station; and a quality message inserting device for inserting the evaluated transmission quality as a quality message into a part of the corresponding frame to be transmitted to the first station. The first station further includes a message processing device for extracting the quality message from each received frame to convert the extracted quality message into a corresponding message signal to output the message signal; and a control device for causing the clock selecting device to select a clock corresponding to the message signal output from the message processing device.

6 Claims, 14 Drawing Sheets

5,619,532

DIGITAL COMMUNICATION SYSTEM

BACKGROUND OF THE INVENTION

1. Field of the Invention

The present invention relates to a digital communication system for use in networks such as U.S. SONET (Synchronous Optical Network).

2. Related Art

Conventionally, networks of this type have been adapted to use a frame having a format known as STS-1 as shown in FIG. 5 to transmit information of 90 bytes×9 rows per frame at a rate of 51.84 Mb/s. In the frame of FIG. 5, the bits represented by (a), (b) and (c) are known as overhead bits into which control data for controlling the network is inserted, and the bits represented by (d1) and (d2) indicate communication data (information to be transmitted).

With conventional digital communication systems for use in such a network when data is transmitted between first and second stations, the second station switches the clock thereof in response to an alarm received from the first station, i.e., LOS (loss of signal), LOF (loss of frame) or LAIS (line alarm indication signal). In this case, however, it is difficult to select an optimum clock according to the deterioration degree of line condition (transmission quality), thereby lowering signal accuracy.

The first station successively transmits to the second station frames each having communication data and parity check data inserted therein based on a first clock generated in the first station. The second station performs parity calculation on the communication data in each of the received frames to judge if the calculation result matches the parity check data or not, then inserts numeric data indicative of a mismatch count into a corresponding frame, and successively transmits the frames each inserted with numeric data to the first station based on a second clock generated in the second station. The first station adds up the numeric data for each unit time to detect line condition between the first and second stations from the addition result (sum of parity errors per unit time). In this case, however, a small or no phase difference between the first and second clocks in the second station often causes the numeric data to fail to be inserted into the corresponding frame or causes the same numeric data to be inserted into two successive frames, resulting in a large error of the sum of the numeric data calculated in the first station.

SUMMARY OF THE INVENTION

In accordance with the present invention, there is provided a digital communication system comprising; a first station; a second station; and a network for transmitting predetermined communication frames between the first and second stations, the communication frame including a communication data part for accepting communication data and a control data part for accepting control data, the first station successively transmitting the frames to the second station based on a first clock generated in the first station, the second station evaluating transmission quality of data in the frame received from the first station based on the data in the frame and inserting the evaluated transmission quality into the control data part to successively transmit the frames to the first station based on a second clock generated in the second station, in which the first station comprises; clock selecting means for selecting one clock as the first clock from a plurality of different clocks; and transmitting means for transmitting the frame to the second station based on the selected clock, the second station comprises; evaluating means for evaluating transmission quality of data in the frame received from the first station; and quality message inserting means for inserting the evaluated transmission quality as a message into a part of the frame to be transmitted to the first station; and the first station further comprises; message processing means for extracting the quality message from the received frame to convert the extracted quality message into a corresponding message signal to output the message signal; and control means for causing the clock selecting means to select a clock corresponding to the message signal output from the message processing means.

In accordance with the present invention, there is provided a digital communication system comprising; a first station; a second station; and a network for transmitting predetermined communication frames between the first and second stations, the communication frame including a communication data part for accepting communication data and a control data part for accepting control data, the first station successively transmitting the frames to the second station based on a first clock generated in the first station, the second station evaluating transmission quality of data in the frame received from the first station based on the data in the frame and inserting the evaluated transmission quality into the control data part to successively transmit the frames to the first station based on a second clock generated in the second station, parity check data being inserted into the control data part of each frame transmitted from the first station to the second station, in which the second station comprises; parity check counting means for performing a parity check on each of the frames received from said first station to output numeric data indicative of a mismatch count; reception timing generating means for generating a reception timing signal having the same cycle as the frames received from said first station based on said first clock; transmission timing generating means for generating a transmission timing signal having the same cycle as the frames to be transmitted to the first station based on the second clock; auxiliary timing generating means for generating an auxiliary timing signal having a half-cycle phase offset with respect to the transmission timing signal; timing selecting means for selecting either one of the transmission timing signal and the auxiliary timing signal to output the selected timing signal; receiver latch means for latching the numeric data in synchronization with the reception timing signal; transmitter latch means for latching the numeric data latched by the receiver latch means in synchronization with the timing signal output from the timing selecting means; and numeric data inserting means for inserting the numeric data latched by the transmitter latch means into the corresponding frame to be transmitted to the first station, the timing selecting means switching a timing signal to be output between the transmission timing signal and the auxiliary timing signal when a phase difference between the reception timing signal and the timing signal output from the timing selecting means is not greater than a predetermined value.

In accordance with the present invention, there is provided a digital communication system comprising; a first station; a second station; and a network for transmitting predetermined communication frames between the first and second stations, the communication frame including a communication data part for accepting communication data and a control data part for accepting control data, the first station successively transmitting the frames to the second station based on a first clock generated in the first station, the second station evaluating transmission quality of data in the frame received from the first station based on the data in the frame and inserting the evaluated transmission quality into the control data part to successively transmit the frames to the first station based on a second clock generated in the second station, parity check data being inserted into the control data part of each frame transmitted from the first station to the second station, in which the second station comprises: parity check counting means for performing a parity check on each of the frames received from the first station to output numeric data indicative of a mismatch count; reception timing generating means for generating a reception timing signal having the same cycle as the frames received from the first station based on the first clock; auxiliary timing generating means for generating an auxiliary timing signal having a half-cycle phase offset with respect to the reception timing signal; timing selecting means for selecting either one of the reception timing signal and the auxiliary timing signal to output the selected timing signal; transmission timing generating means for generating a transmission timing signal having the same cycle as the frames to be transmitted to the first station based on the second clock; receiver latch means for latching the numeric data in synchronization with the timing signal output from the timing selecting means; transmitter latch means for latching the numeric data latched by the receiver latch means in synchronization with the transmission timing signal; and numeric data inserting means for inserting the numeric data latched by the transmitter latch means into the corresponding frame to be transmitted to the first station, the timing selecting means switching a timing signal to be output between the reception timing signal and the auxiliary timing signal when a phase difference between the timing signal output from the timing selecting means and the transmission timing signal is not greater than a predetermined value.

DESCRIPTION OF THE PREFERRED EMBODIMENTS

Figure 1:
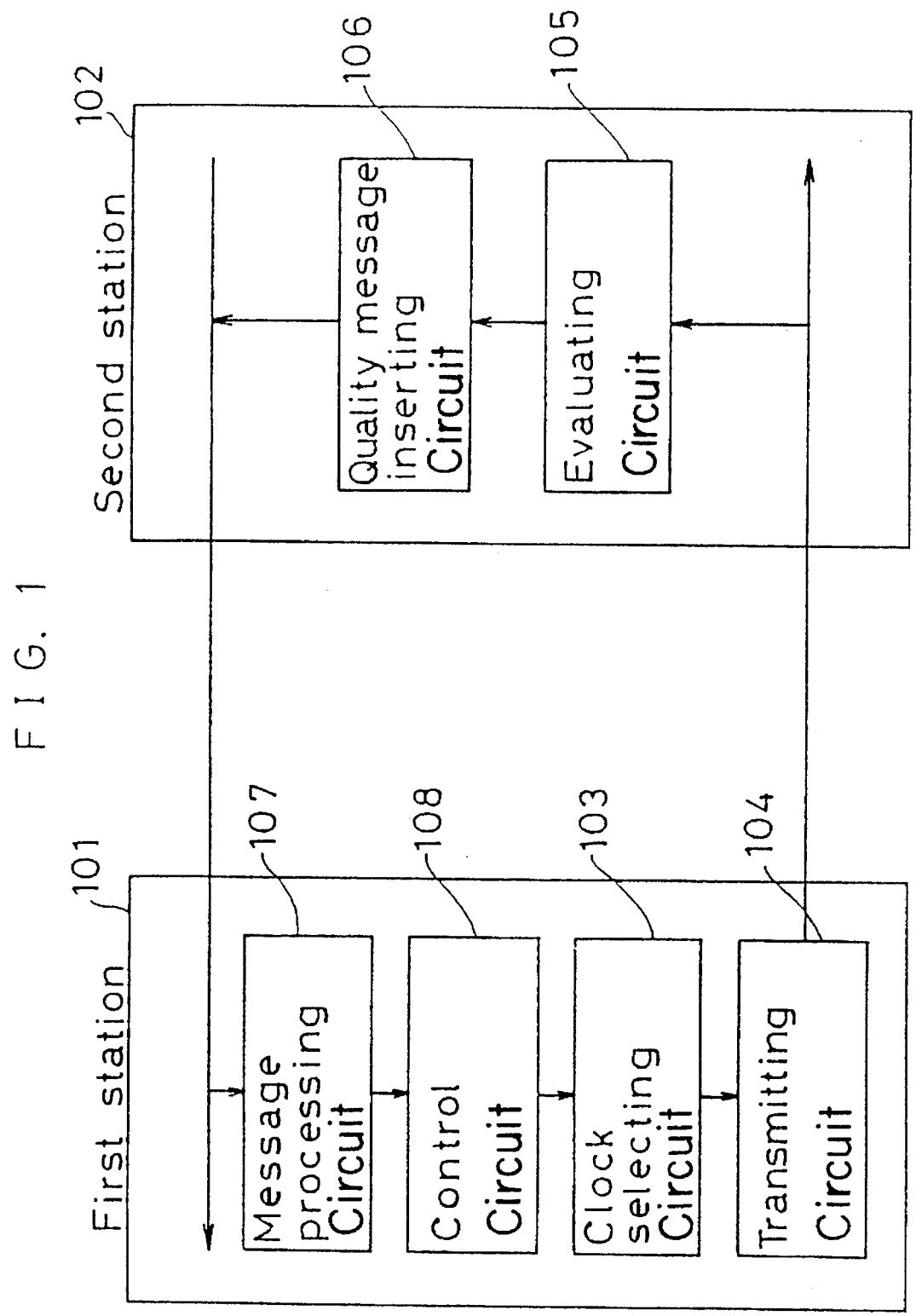
FIG. 1 is a block diagram of a basic structure in accordance with the present invention.

FIG. 1 is a block diagram of a basic structure in accordance with the present invention. There is shown a digital communication system for transmitting communication data each inserted into a predetermined communication frame between a first station 101 and a second station 102. The first station 101 includes a clock selecting means 103 for selecting one clock from a plurality of different clocks, and a transmitting means 104 for transmitting the frame to the second station 102 based on the selected clock. The second station 102 includes an evaluating means 105 for evaluating the transmission quality of data in the frame received from the first station 101, and a quality message inserting means 106 for inserting the evaluated transmission quality as a quality message into a part of the frame to be transmitted to the first station 101. The first station 101 further includes a message processing means 107 for extracting the quality message from each received frame to convert the extracted quality message into a corresponding message signal to output the message signal, and a control means 108 for causing the clock selecting means 103 to select a clock corresponding to the message signal output from the message processing means 107.

According to the present invention, as shown in FIG. 1, the clock selecting means 103 selects one clock from the plurality of different clocks, and the transmitting means 104 transmits the frame to the second station 102 based on the selected clock. The second station 102 evaluates the transmission quality of the data in the frame received from the first station 101, and the quality message inserting means 106 inserts the evaluated transmission quality as the quality message into the frame to be transmitted to the first station 101.

In the first station 101, the message processing means 107 extracts the quality message from each received frame to convert the extracted quality message into the corresponding message signal to output the message signal, and the control means 108 causes the clock selecting means 103 to select the clock corresponding to the message signal output from the message processing means 107.

Thus, switching between clocks in the first station 101 is suitably performed according to the quality of the data transmitted from the first station 101 to the second station 102.

Where the message processing means 107 includes a comparing means for comparing the extracted quality message with a predetermined message, the comparison result is output as the message signal, and the clock selecting means 103 suitably selects the clock according to the message signal.

Preferably, the message processing means 107 includes a comparing means for determining by comparison if the extracted quality message matches a predetermined message or not, thereby outputting the comparison result as the message signal. Then, the control means 108 causes the clock selecting means 103 to suitably select the clock according to the message signal.

Preferably, the message processing means 107 includes an extracting means for successively extracting quality messages from a plurality of frames, and a comparing means for comparing with each other the plural quality messages successively extracted, and the message processing means 107 outputs a message signal indicative of the presence of a predetermined number of successive identical quality massages, if detected. Then, the control means 108 causes the clock selecting means 103 to suitably select the clock according to the message signal.

Alternatively, the message processing means 107 may include an extracting means for successively extracting quality messages from a plurality of frames, and a comparing means for comparing with each other the plural quality messages successively extracted, and the message processing means 107 may output a message signal indicative of the absence of a predetermined number of successive identical quality messages, if not detected.

Figure 2:
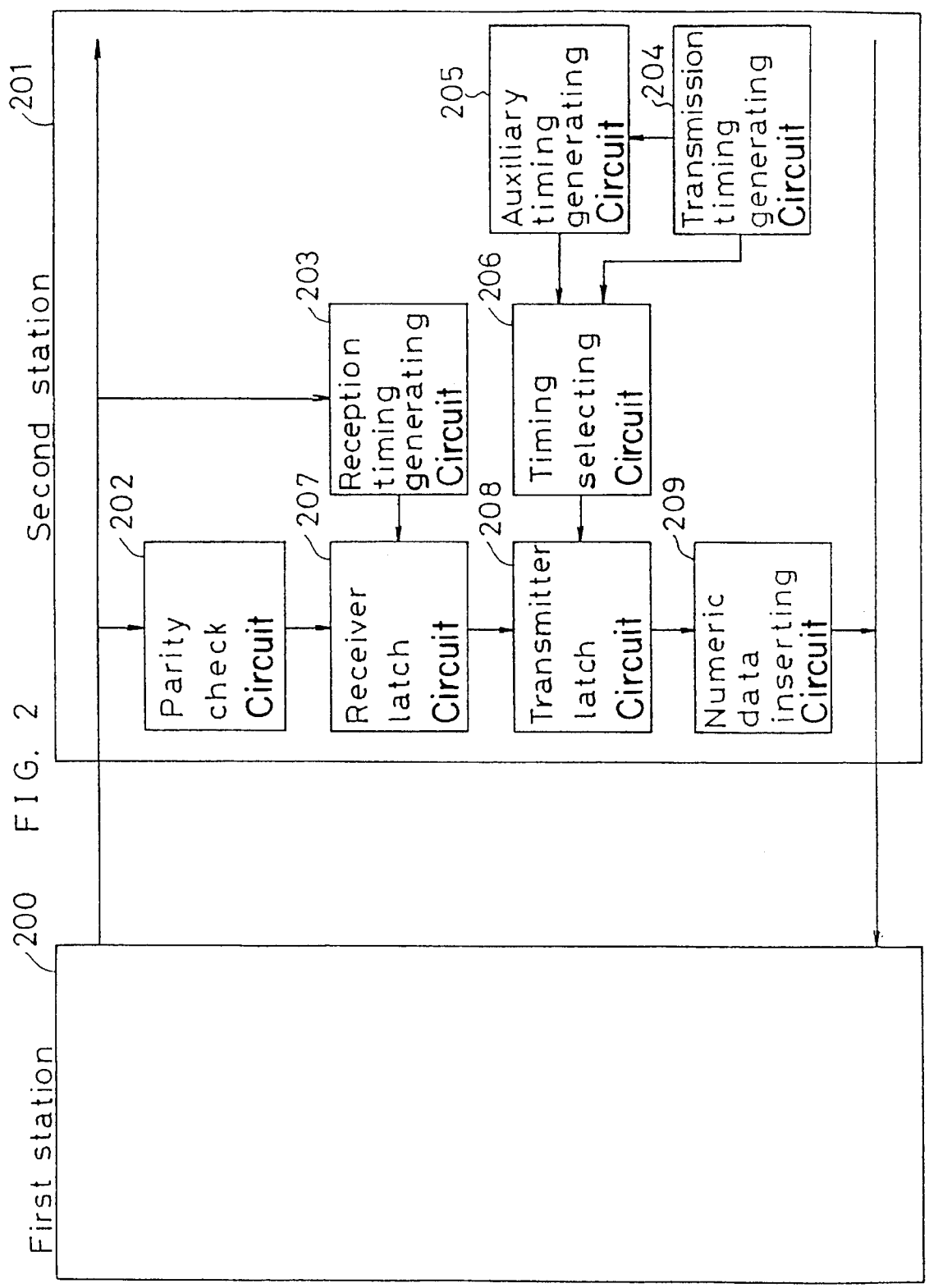
FIG. 2 is a block diagram of another basic structure in accordance with the present invention.

FIG. 2 is a block diagram of another basic structure in accordance with the present invention. There is shown a digital communication system for transmitting communication data inserted into predetermined communication frames between a first station 200 and a second station 201. The first station 200 inserts communication data and parity check data into each of the frames based on a first clock generated in the first station 200 and successively transmits the frames to the second station 201. The second station 201 performs parity calculation on the communication data in each of the received frames to judge if the calculation result matches the parity check data or not, and then inserts numeric data indicative of a mismatch count into a corresponding frame and successively transmits the frames each inserted with numeric data to the first station 200 based on a second clock generated in the second station 201. The second station 201 includes: a parity check counting means 202 for performing a parity check on each of the frames received from the first station 200 to output the mismatch count as numeric data; a reception timing generating means 203 for generating a reception timing signal having the same cycle as the frames received from the first station 200 based on the first clock; a transmission timing generating means 204 for generating a transmission timing signal having the same cycle as the frames to be transmitted to the first station 200 based on the second clock; an auxiliary timing generating means 205 for generating an auxiliary timing signal having a half-cycle phase offset with respect to the transmission timing signal; a timing selecting means 206 for selecting either one of the transmission timing signal and the auxiliary timing signal to output the selected timing signal; a receiver latch means 207 for latching the numeric data in synchronization with the reception timing signal; a transmitter latch means 208 for latching the numeric data latched by the receiver latch means 207 in synchronization with the timing signal output from the timing selecting means 206; and a numeric data inserting means 209 for inserting the numeric data latched by the transmitter latch means 208 into the corresponding frame to be transmitted to the first station 200. The timing selecting means 206 switches a timing signal to be output between the transmission timing signal and the auxiliary timing signal when a phase difference between the reception timing signal and the timing signal output from the timing selecting means 206 is equal to or less than a predetermined value.

According to the present invention, as shown in FIG. 2, the parity check counting means 202 in the second station 201 performs the parity check on each of the frames received from the first station 200 to output the mismatch count as the numeric data. The reception timing generating means 203 generates the reception timing signal having the same cycle as the frames received from the first station 200 based on the first clock. The transmission timing generating means 204 generates the transmission timing signal having the same cycle as the frames to be transmitted to the first station 200 based on the second clock. The auxiliary timing generating means 205 generates the auxiliary timing signal having a half-cycle phase offset with respect to the transmission timing signal. The timing selecting means 206 selects either one of the transmission timing signal and the auxiliary timing signal, and outputs the selected signal.

The receiver latch means 207 latches the numeric data in synchronization with the reception timing signal. The transmitter latch means 208 latches the numeric data latched by the receiver latch means 207 in synchronization with the timing signal output from the timing selecting means 206. The numeric data inserting means 209 inserts the numeric data latched by the transmitter latch means 208 into the corresponding frame to be transmitted to the first station 200. The timing selecting means 206 switches the timing signal to be output between the transmission timing signal and the auxiliary timing signal when the phase difference between the reception timing signal and the timing signal output from the timing selecting means 206 is equal to or less than the predetermined value.

Figure 3:
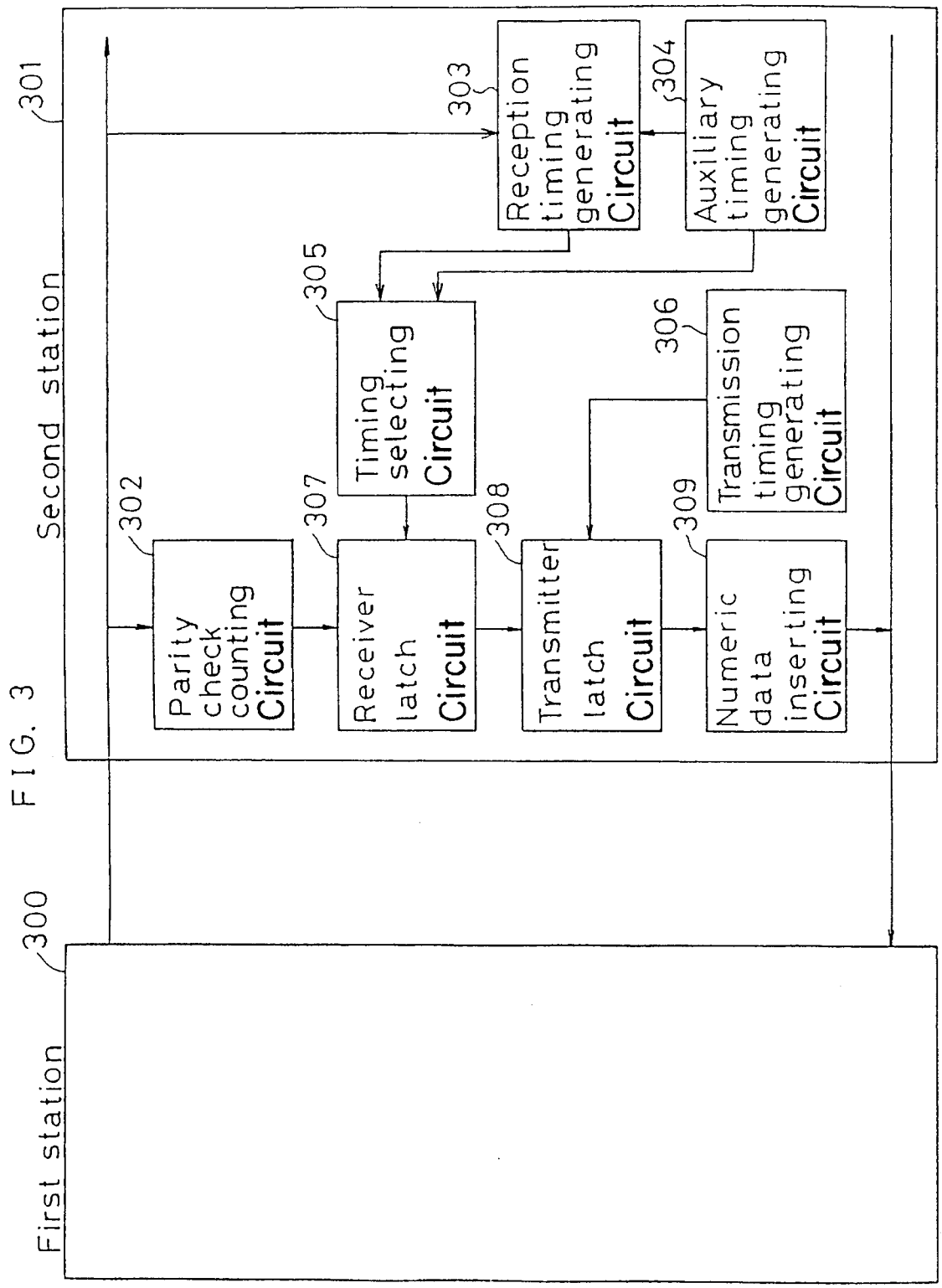
FIG. 3 is a block diagram of still another basic structure in accordance with the present invention.

FIG. 3 is a block diagram of still another basic structure in accordance with the present invention. There is shown a digital communication system for transmitting communication data inserted into predetermined communication frames between a first station 300 and a second station 301. The first station 300 inserts communication data and parity check data into each of the frames based on a first clock generated in the first station 300 and successively transmits the frames to the second station 301. The second station 301 performs parity calculation on the communication data in each of the received frames to judge if the calculation result matches the parity check data or not, and then inserts numeric data indicative of a mismatch count into a corresponding frame and successively transmits the frames each inserted with numeric data to the first station 300 based on a second clock generated in the second station 301. The second station 301 includes a parity check counting means 302 for performing a parity check on each of the frames received from the first station 300 to output the mismatch count as numeric data; a reception timing generating means 303 for generating a reception timing signal having the same cycle as the frames received from the first station 300 based on the first clock; an auxiliary timing generating means 304 for generating an auxiliary timing signal having a half-cycle phase offset with respect to the reception timing signal; a timing selecting means 305 for selecting either one of the reception timing signal and the auxiliary timing signal to output the selected timing signal; a transmission timing generating means 306 for generating a transmission timing signal having the same cycle as the frames to be transmitted to the first station 300 based on the second clock; a receiver latch means 307 for latching the numeric data in synchronization with the timing signal output from the timing selecting means 305; a transmitter latch means 308 for latching the numeric data latched by the receiver latch means 307 in synchronization with the transmission timing signal; and a numeric data inserting means 309 for inserting the numeric data latched by the transmitter latch means 308 into the corresponding frame to be transmitted to the first station 300. The timing selecting means 305 switches a timing signal to be output between the reception timing signal and auxiliary timing signal when a phase difference between the timing signal output from the timing selecting means 305 and the transmission timing signal is equal to or less than a predetermined value.

According to the present invention, as shown in FIG. 3, the parity check counting means 302 in the second station 301 performs the parity check on each of the frames received from the first station 300 to output the mismatch count as the numeric data. The reception timing generating means 303 generates the reception timing signal having the same cycle as the frames received from the first station 301 based on the first clock. The auxiliary timing generating means 304 generates the auxiliary timing signal having a half-cycle phase offset with respect to the reception timing signal. The timing selecting means 305 selects either one of the reception timing signal and the auxiliary timing signal, and outputs the selected timing signal. The transmission timing generating means 306 generates the transmission timing signal having the same cycle as the frames to be transmitted to the first station 300 based on the second clock.

The receiver latch means 307 latches the numeric data in synchronization with the timing signal output from the timing selecting means 305. The transmitter latch means 308 latches the numeric data latched by the receiver latch means 307 in synchronization with the transmission timing signal. The numeric data inserting means 309 inserts the numeric data latched by the transmitter latch means 308 into the corresponding frame to be transmitted to the first station 300. The timing selecting means 305 switches the timing signal to be output between the reception timing signal and auxiliary timing signal when the phase difference between the timing signal output from the timing selecting means 305 and the transmission timing signal is equal to or less than the predetermined value.

The second stations 201 and 301 shown in FIGS. 2 and 3, respectively, may include a monitoring means for monitoring the insertion of the numeric data into the corresponding frame; a converting means for converting, when identical numeric data are inserted into two successive frames, the numeric data inserted into one of the two successive frames into numeric data indicative of zero; and an adding means for adding, when numeric data fails to be inserted into the corresponding frame, the value of the numeric data to the value of numeric data inserted into the subsequent fame. Thus, when the identical numeric data are inserted into two successive frames by mistake, the numeric data to be inserted into one of the frames is converted into the numeric data indicative of zero. When numeric data fails to be inserted into the corresponding frame, the numeric data is added to the value of numeric data to be inserted into the subsequent frame.

Explanation will now be given to first and second embodiments according to the present invention. It should be noted that the embodiments are not limitative of the present invention.

First Embodiment

Figure 4:
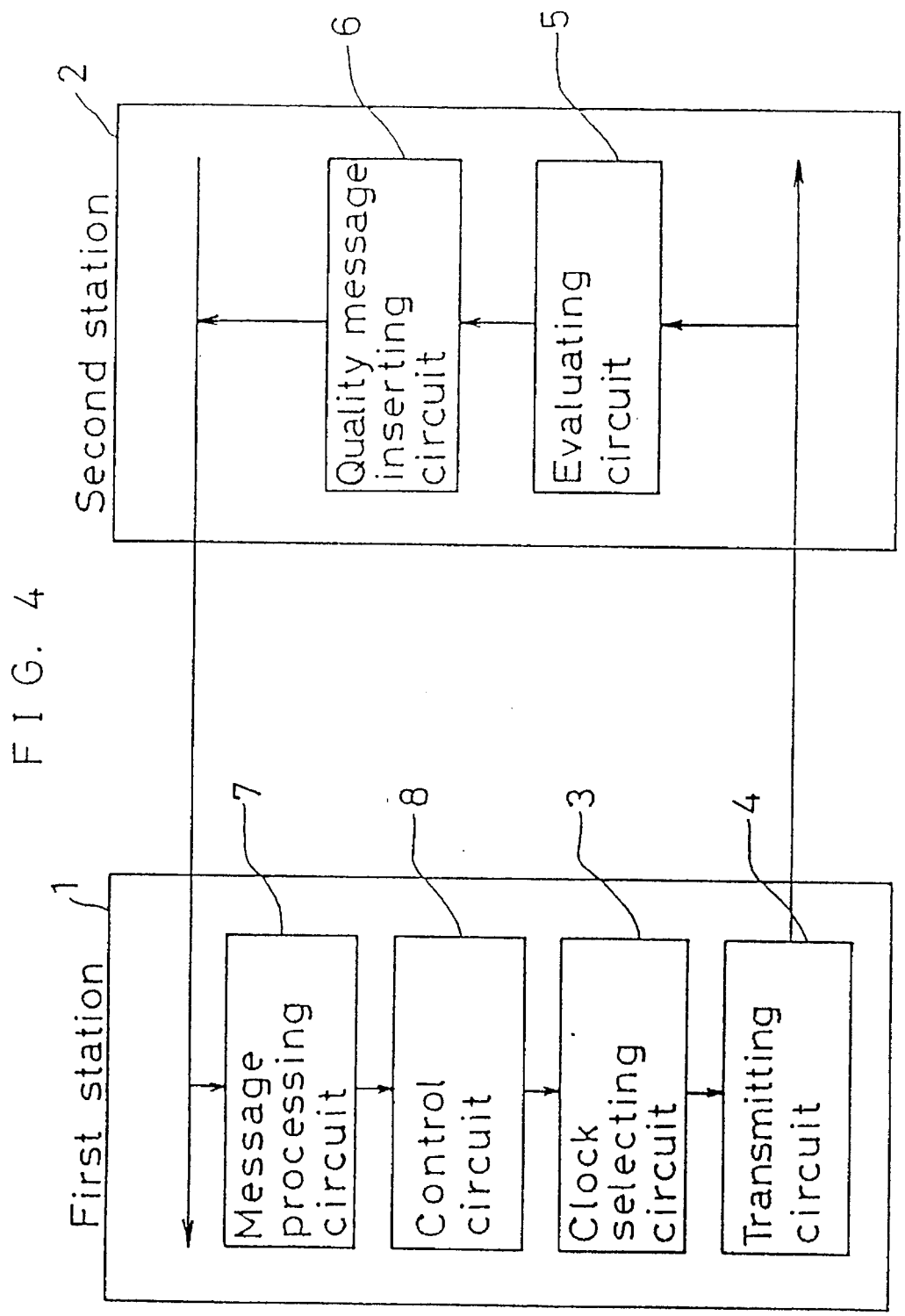
FIG. 4 is a block diagram of a first embodiment in accordance with the present invention.
Figure 5:
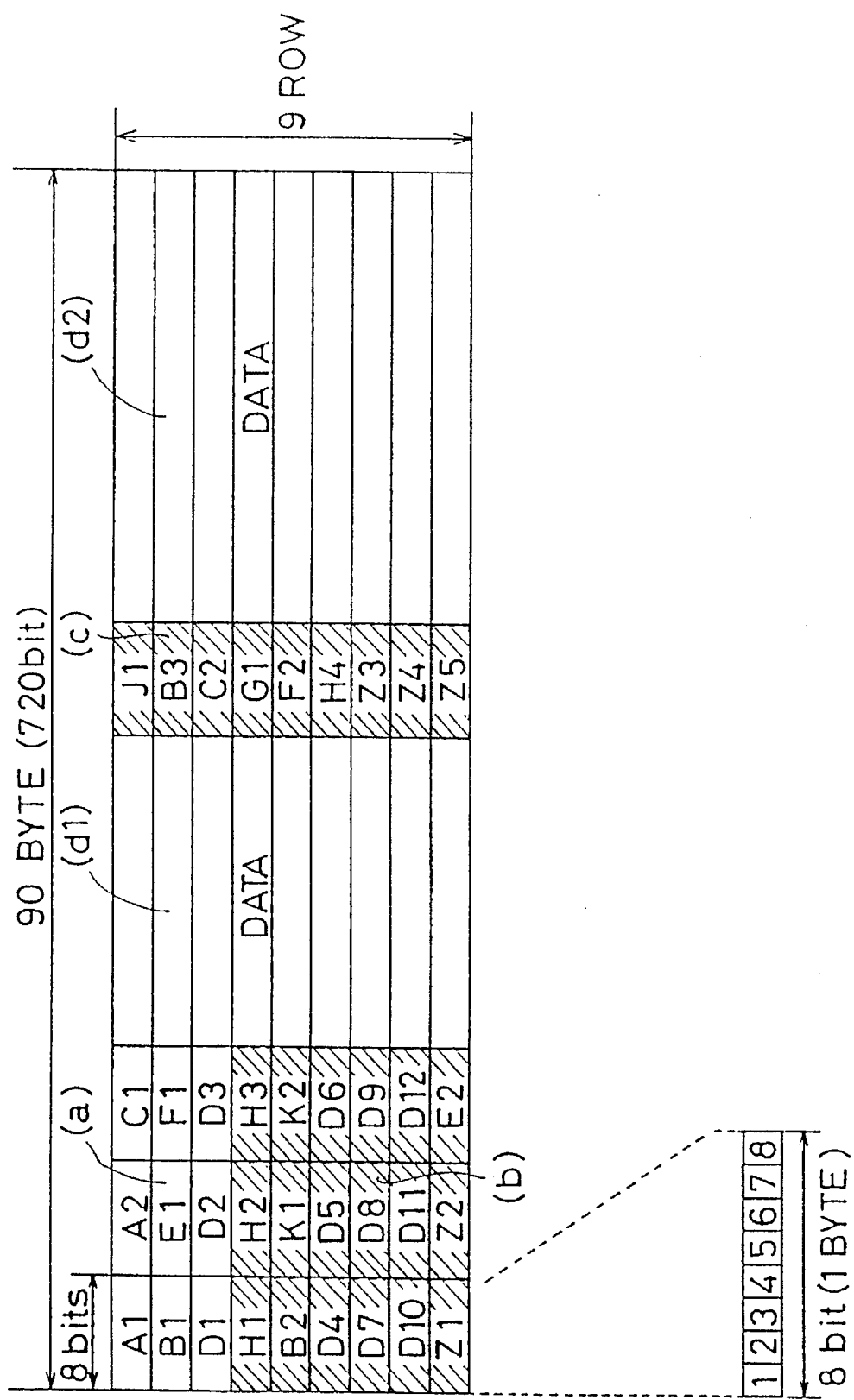
FIG. 5 is a diagram for explaining a format of a frame applied to first and second embodiments in accordance with the present invention.

FIG. 4 is a block diagram of a first embodiment in accordance with the present invention which illustrates part of Synchronous Optical Network (SONET) used in U.S.A. Referring to FIG. 4, communication data inserted into frames having a format known as STS-1 of FIG. 5 are transmitted at a rate of 51.84 Mb/s between a first station 1 and a second station 2. The frame format of FIG. 5 includes a section overhead (a), a line overhead (b), a path overhead (c) and data (d1) and (d2), and is of 90 bytes (720 bits)×9 rows. Referring to FIG. 4, the first station 1 includes a clock selecting circuit 3 for selecting one clock from a plurality of different clocks, and a transmitting circuit 4 for transmitting the frames to the second station 2 based on the selected clock. The second station 2 includes an evaluating circuit 5 for evaluating the transmission quality of data in each of the frames received from the first station 1, and a quality message inserting circuit 6 for inserting the evaluated transmission quality as a quality message into a part of a corresponding frame to be transmitted to the first station 1. The first station 1 further includes a message processing circuit 7 for extracting the quality message from each received frame to convert the extracted quality message into a corresponding message signal to output the message signal, and a control circuit 8 for causing the clock selecting circuit 3 to select a clock in response to the message signal output from the message processing circuit 7.

In this embodiment, the part of a frame into which the quality message is inserted by the quality message inserting circuit 6 corresponds to a Z1-byte of the line overhead (b) in the frame format of FIG. 5. The plurality of clocks from which the clock selecting circuit 3 selects one clock include, for example, a primary clock, a secondary clock and an instation clock which have been prepared in the respective stations. The control circuit 8 includes a microprocessor. The clock selecting circuit 3, the transmitting circuit 4, the evaluating circuit 5 and the quality message inserting circuit 6 may employ the conventional circuits.

Figure 6:
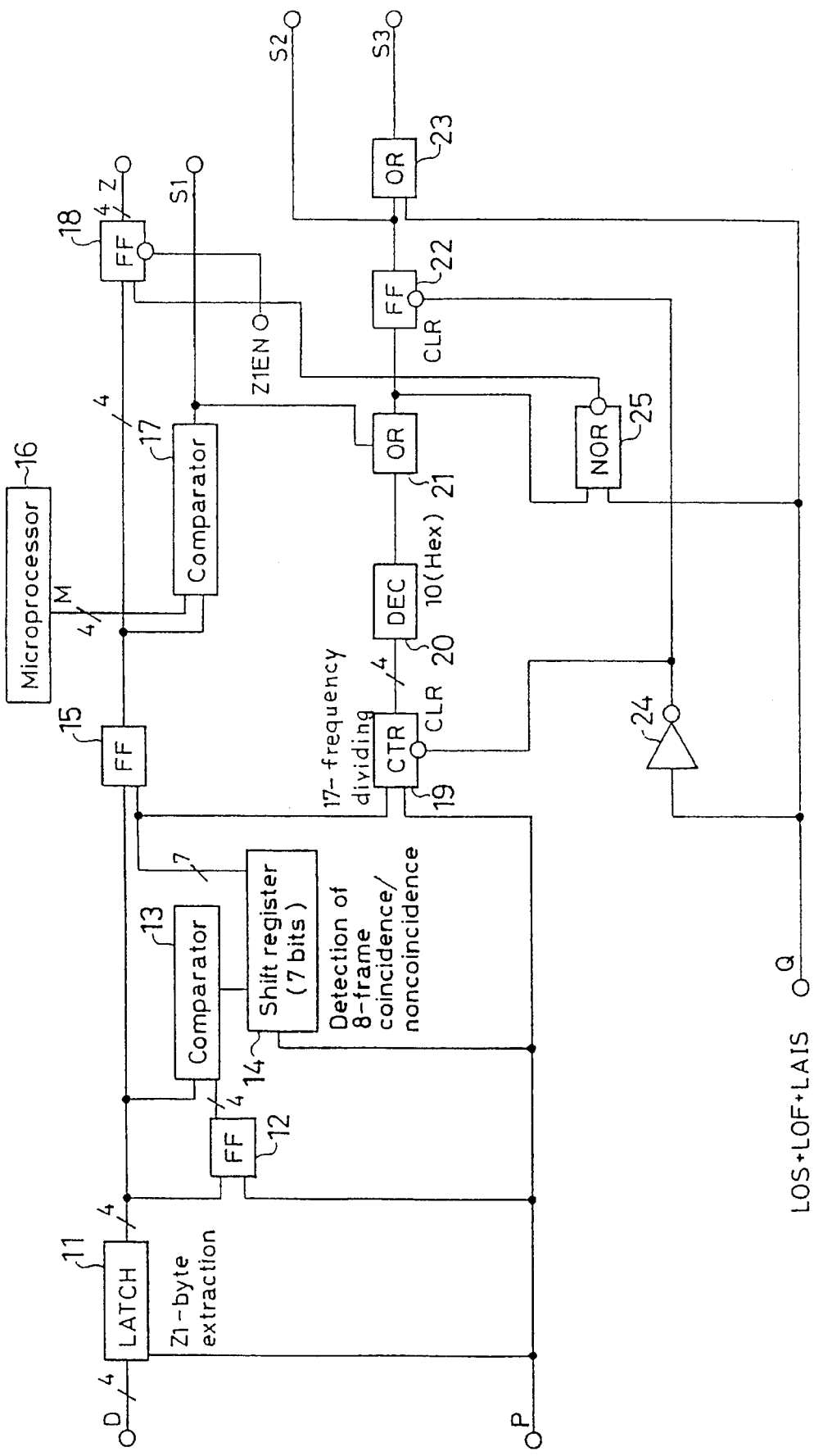
FIG. 6 is a circuit diagram of a major portion shown in FIG. 4.

Next, the message processing circuit 7 will be described in detail with reference to FIG. 6.

As shown, the message processing circuit 7 includes: a latch circuit 11 for extracting a Z1-byte (4 lower bits) code from a frame D transmitted from The second station 2 to the first station 1 in synchronization with a Z1-byte extraction pulse P generated by a Z1-byte extraction pulse generator not shown; a flip-flop 12 for delaying the Z1-byte code extracted in the latch circuit 11 by one frame; a comparator circuit 13 for comparing the output from the latch circuit 11 with the output from the flip-flop 12 to judge if the current Z1-byte code matches the one-frame previous Z1-byte code; a shift register 14 for detecting a match of Z1-byte codes in eight successive frames; and a flip-flop 15 for latching the matched Z1-byte code Z when the match of the Z1-byte codes in eight successive frames is detected in the shift register 14. There is also shown a microprocessor 16 for outputting a preset code (synchronous message code) M, which is included in the control circuit 8.

The processing circuit 7 further includes: a comparator circuit 17 for comparing the matched Z1-byte code Z output from the flip-flop 15 with the code M to output a signal S1 (low) when the codes Z and M match each other, a flip-flop 18 for latching the Z1-byte code Z matched in eight successive frames; a counter 19 for detecting a mismatch of the Z1-byte code in 24 successive frames; a decoder 20 for outputting "high" when the mismatch of Z1-byte codes in 24 successive frames is detected; an OR gate 21 for outputting the logical sum of the outputs (high) generated from the decoder 20 when the mismatch of the Z1-byte codes in 24 successive frames is detected and outputting the logical sum of the outputs (high) generated from the comparator circuit 17 when the matched Z1 byte code Z from the flip-flop 15 does not match the code M; a flip-flop 22 for latching the output from the OR gate 21 as a signal S2; an OR gate 23 for outputting a high-level signal S3 when the output S2 from the flip-flop 22 is high or when a signal Q is high; an invertor 24 for clearing the counter 19 and the flip-flop 22 when the signal Q is low; and an NOR gate 25 for holding the flip-flop 18 when the output from the OR gate 21 and the signal Q are both low.

The signal Q is the sum of the conventional line fault alarm signals, i.e., LOS (loss of signal), LOF (loss of frame) and LAIS (line alarm indication signal) and the like, which are detected by a detecting circuit (not shown) in the first station 1.

Operations in the message processing circuit 7 shown in FIG. 6 will be described below.

The latch circuit 11 extracts the Z1-byte from the frame D, and the comparator circuit 13 and the shift register 14 cooperatively monitor a matching state to see if the Z1-byte codes in eight successive frames match each other. When the Z1-byte code Z matched in eight successive frames matches the code M set in the microprocessor 16, the output signal S1 from the comparator circuit 17 goes low.

When a mismatch is detected, the signal S1 goes high. Upon detection of three sets of mismatches of the Z1-byte codes in eight successive frames, i.e., Z1-byte codes mismatched in 24 successive frames, the output signal S2 from the flip-flop 22 goes high. When at least one of the signals S2 and Q is high, the output signal S3 from the OR gate 23 goes high.

The code Z and signals S1, S2 and S3 are input to the microprocessor 16 in the control circuit 8, and the microprocessor 16 judges an optimum clock for the current line condition based on these signals. The control circuit 8 causes the clock selecting circuit 3 to select the optimum clock judged by the microprocessor 16.

In accordance with this embodiment, the second station 2 thus inserts the message about the data transmission quality into the Z1-byte of each frame for transmission, and the first station 1 extracts the Z1-byte and reads the Z1-byte message. The first station 1 also evaluates the transmission quality of the Z1-byte message itself and detects the line condition between the first and second stations to suitably select a clock according to the detected line condition.

Second Embodiment

Figure 7:
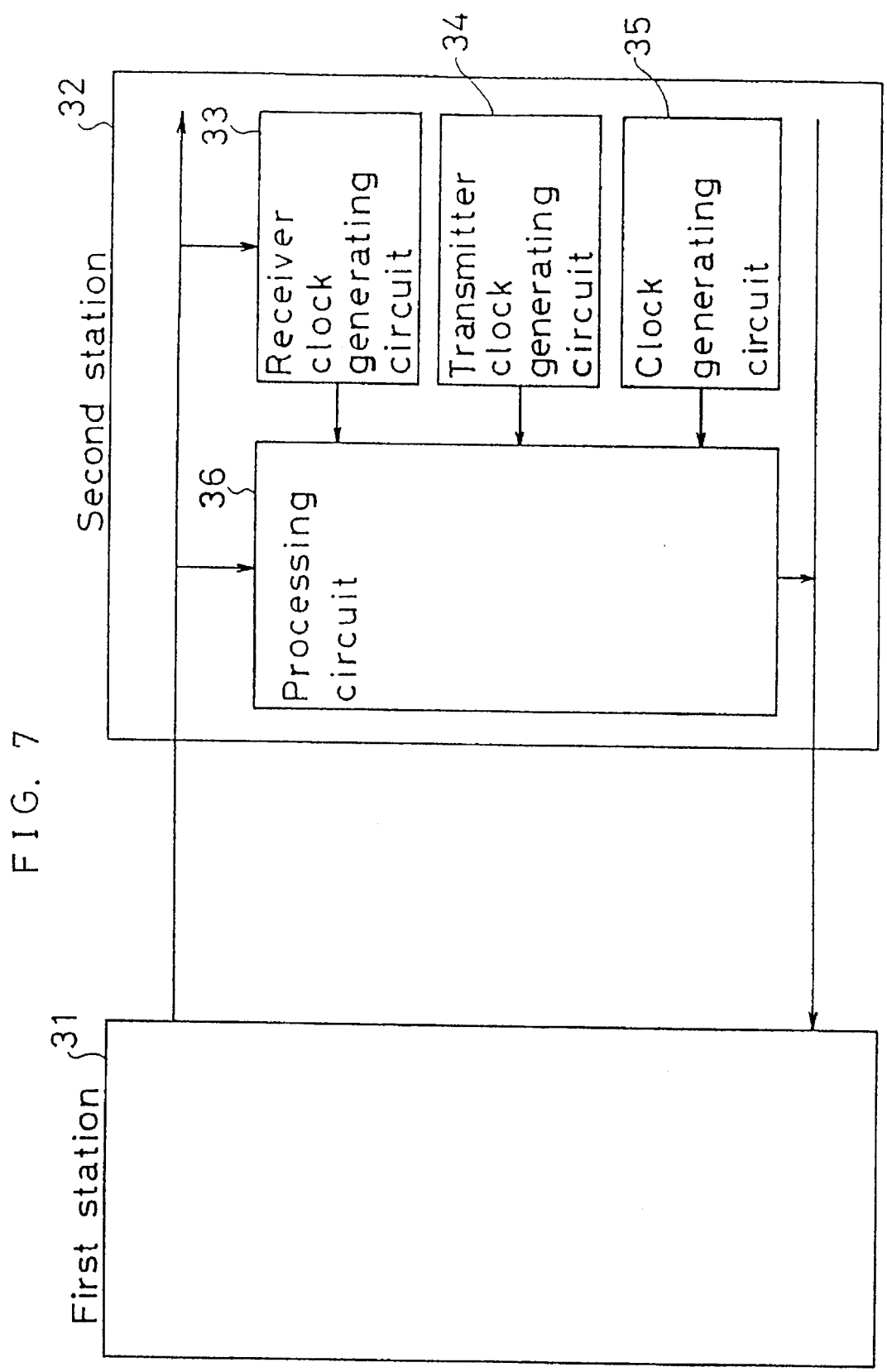
FIG. 7 is a block diagram of the second embodiment in accordance to the present invention.

FIG. 7 is a block diagram of a second embodiment in accordance with the present invention, which illustrates part of the SONET used in U.S.A.

Referring to FIG. 7, communication data inserted into frames having the format shown in FIG. 5 are transmitted between a first station 31 and a second station 32. The first station 31 inserts the communication data and parity check data into each of the frames based on a clock generated in the first station 31 and successively transmits the frames to the second station 32. The second station 32 performs parity calculation on the communication data in each of the frames received by a processing circuit 36 to judge if the calculation result matches the parity check data or not, and then inserts numeric data indicative of a mismatch count (parity error count) into a corresponding frame to be transmitted to the first station 31.

In the first station 31, the parity check data (8 bits) is inserted into a B2-byte in each of the frames to be transmitted to the second station 32. In the second station 32, the numeric data is inserted into a Z2-byte in the corresponding frame to be transmitted to the first station 31.

A receiver clock generating circuit 33 extracts and generates a first clock CLK1 synchronized with the clock generated in the first station 31 based on the data received from the first station 31. A transmitter clock generating circuit 34 generates a second clock CLK2 used for transmitting the frames from the second station 32 to the first station 31. A clock generating circuit 34 generates a clock CLK3 used for converting the pulse width of data.

Figure 8:
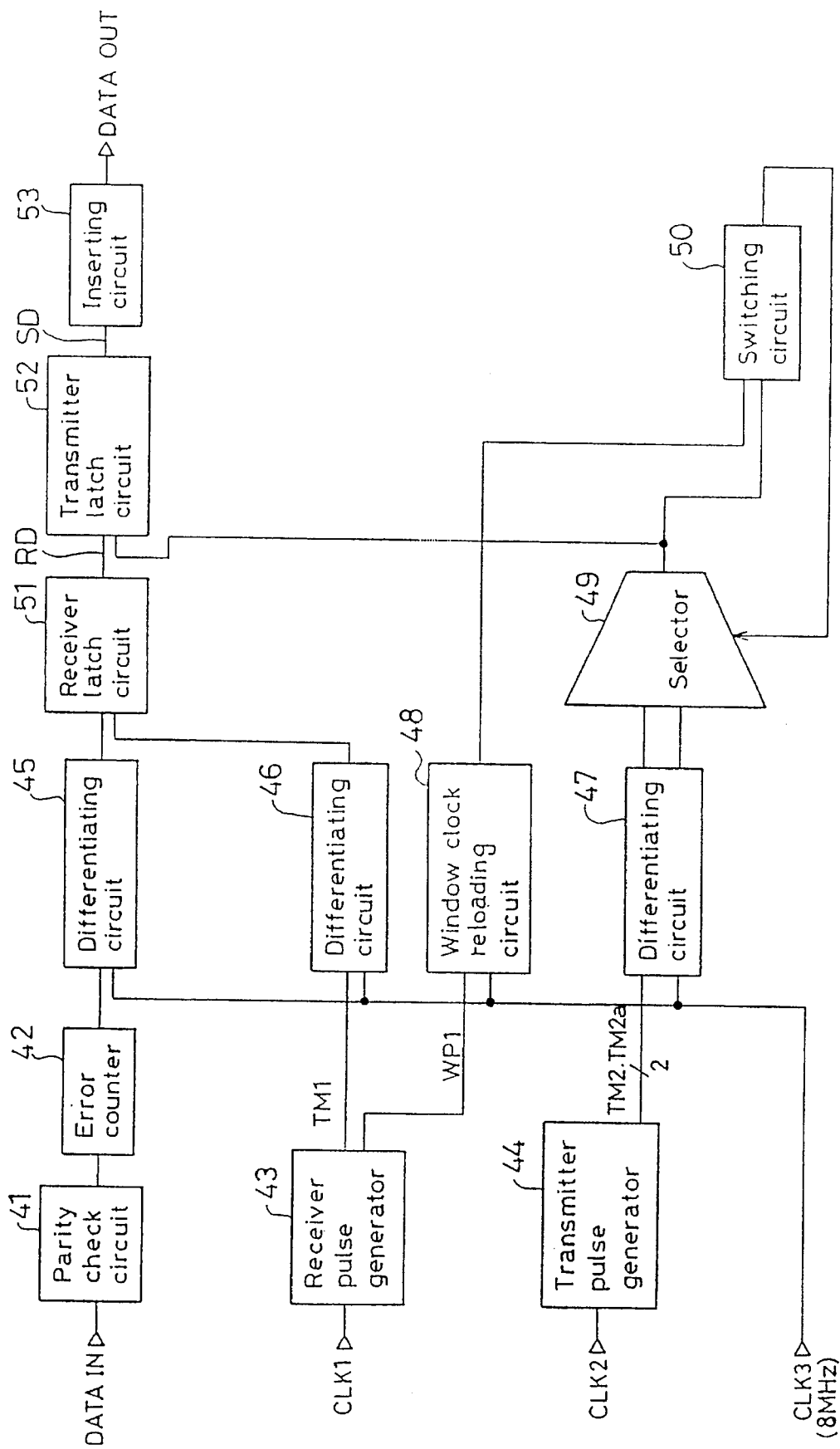
FIG. 8 is a block diagram of a major portion shown in FIG. 7.

FIG. 8 is a detailed block diagram of the processing circuit 36. As shown, the processing circuit 36 includes: a parity check circuit 41 for performing the parity calculation on each of the frames received from the first station 31 and judging by comparison if the calculation result matches the parity check data in the B2-byte in the frame or not; an error counter 42 for counting the number of mismatches (parity errors); and a receiver pulse generator 43 for generating a timing pulse TM1 having a frame cycle and a window pulse WP1 based on the receiver clock CLK1. The window pulse WP1 has a window (or pulse width) having 10 bits before and after the timing pulse TM1.

The processing circuit 36 further includes: a transmitter pulse generator 44 for generating a timing pulse TM2 having a frame cycle and a timing pulse TM2a having a half-cycle phase offset with respect to the timing pulse TM2 based on a clock CLK2; a differentiating circuit 45 for reloading the data (operating based on a 6-MHz clock) output from the error counter 42 onto the 8-MHz clock CLK3; a differentiating circuit 46 for reloading the timing pulse TM1 (operating based on the 6-MHz clock) generated by the receiver pulse generator 43 onto the 8-MHz clock CLK3; a differentiating circuit 47 for reloading the timing pulses TM2 and TM2a (operating based on the 6-MHz clock) generated by the transmitter pulse generator 44 onto the 8-MHz clock CLK3; a window clock reloading circuit 48 for reloading the window pulse WP1 (operating based on the 6-MHz clock) generated by the receiver pulse generator 43 onto the 8-MHz clock CLK3; a selector 49 for selecting either one of the timing pulses TM2 and TM2a to output the selected timing pulse; a switching circuit 50 for switching the output of the selector 49 when the timing overlap between the timing pulse output from the selector 49 and the window pulse WP1 occurs; a receiver latch circuit 51 for latching the output of the error counter 42 in synchronization with the timing pulse TM1; a transmitter latch circuit 52 for latching an output RD of the receiver latch circuit 51 in synchronization with the timing pulse output from the selector 49; and an inserting circuit 53 for inserting an output SD of the transmitter latch circuit 52 into the Z2-byte in the frame to be transmitted to the first station 31.

Operations in the processing circuit 36 having such structure will be described with reference to the timing chart of FIG. 9.

First, as the parity check circuit 41 performs a parity check, the error counter 42 counts the number of parity errors to convert the count into binary data, and outputs the binary data.

Then, the receiver latch circuit 51 latches the binary data in synchronization with the timing pulse TM1 and outputs the binary data as the data RD. The transmitter latch circuit 52 latches the data RD in synchronization with the timing pulse TM2 output from the selector 49 and outputs the data RD as the data SD. The inserting circuit 53 inserts the data SD into the Z2-byte in the frame to be transmitted.

The selector 49 switches the output from the timing pulse TM2 to the timing pulse TM2a at the time T1 (see FIG. 9) when timing overlap between the window pulse WP1 and the timing pulse TM2 occurs. Than, the transmitter latch circuit 52 latches the data RD in synchronization with the timing pulse TM2a.

The selector 49 switches the output from the timing pulse TM2a to the timing pulse TM2 at the time T2 (see FIG. 10) when timing overlap between the window pulse WP1 and the timing pulse TM2a occurs. Then, the transmitter latch circuit 52 latches the data RD in synchronization with the timing pulse TM2.

Figure 9:
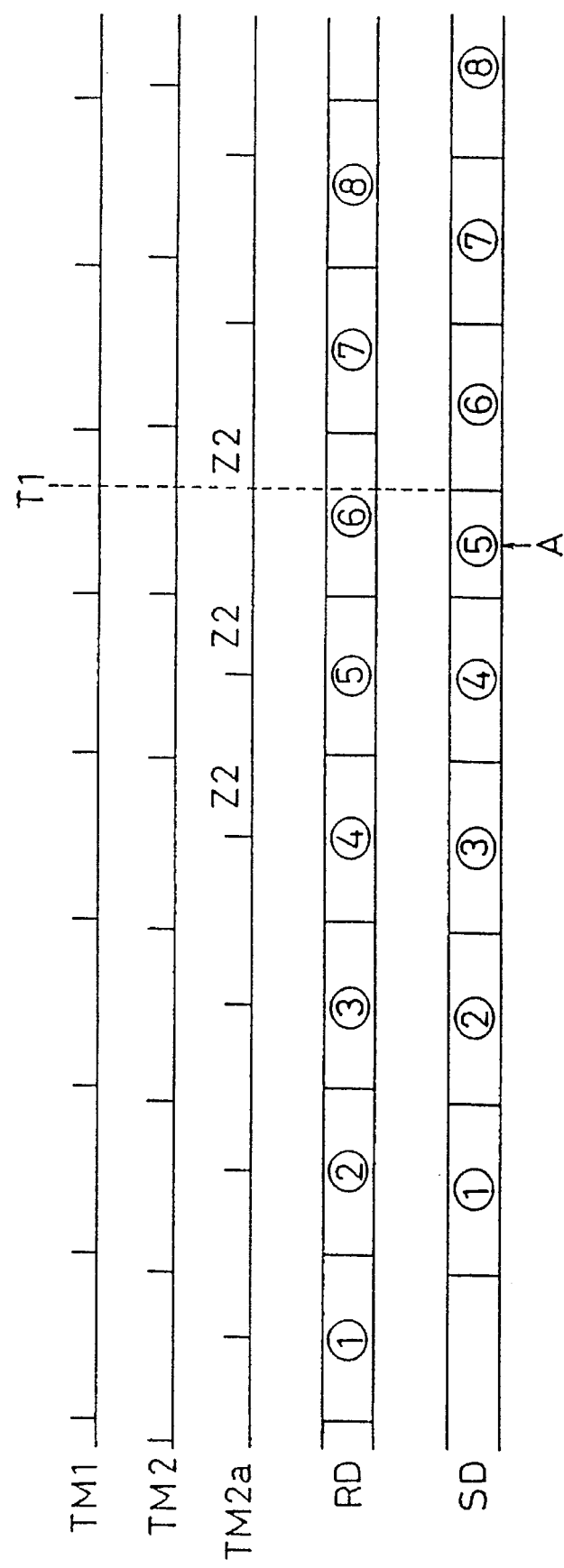
FIGS. 9 and 10 are timing charts for explaining operations in a processing circuit shown in FIG. 8.
Figure 10:
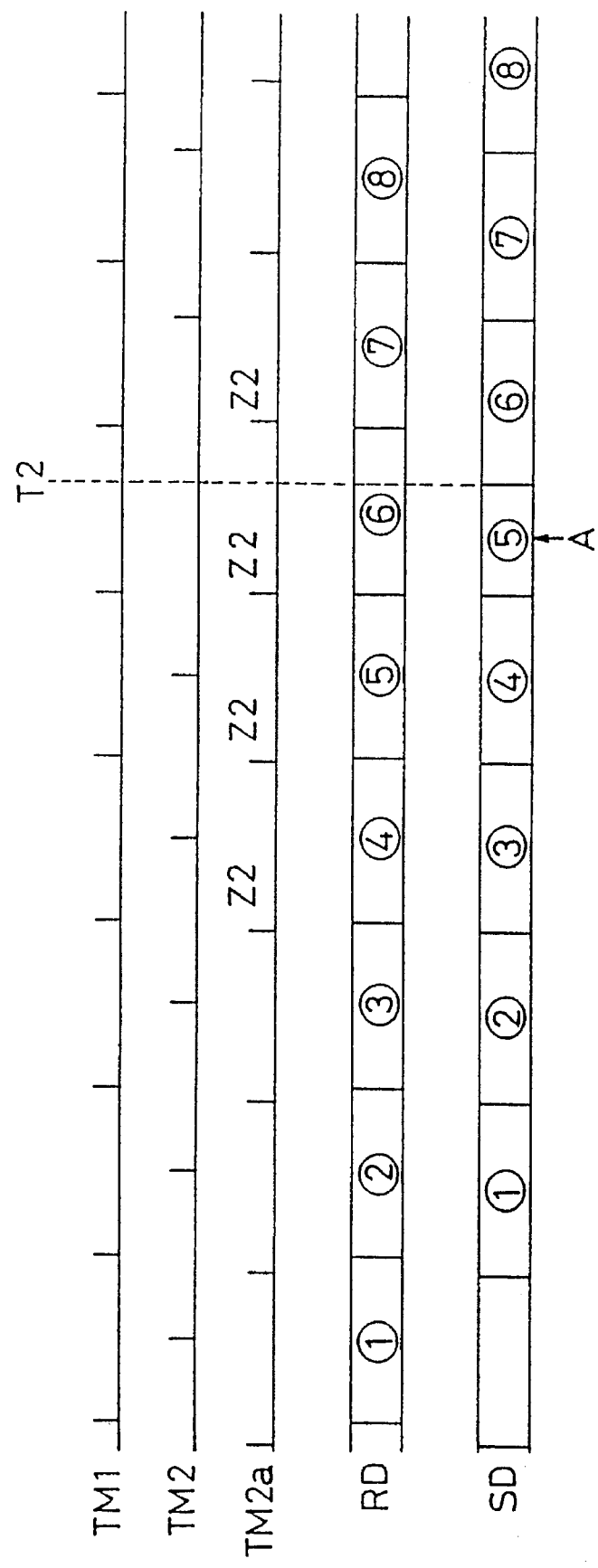

As shown in FIGS. 9 and 10, when a timing pulse output from the selector 49 becomes almost in-phase with respect to the timing pulse TM1, the selector 49 outputs another timing pulse having a half-cycle phase offset. This prevents the latch timings of the receiver latch circuit 51 and the transmitter latch circuit 52 from coinciding with each other, thereby reducing to a negligible level the frequency of failures in data insertion into the Z2-byte and the insertion of the same data into the Z2-bytes in two successive frames. These failures are problems that the conventional circuits have suffered.

Figure 11:
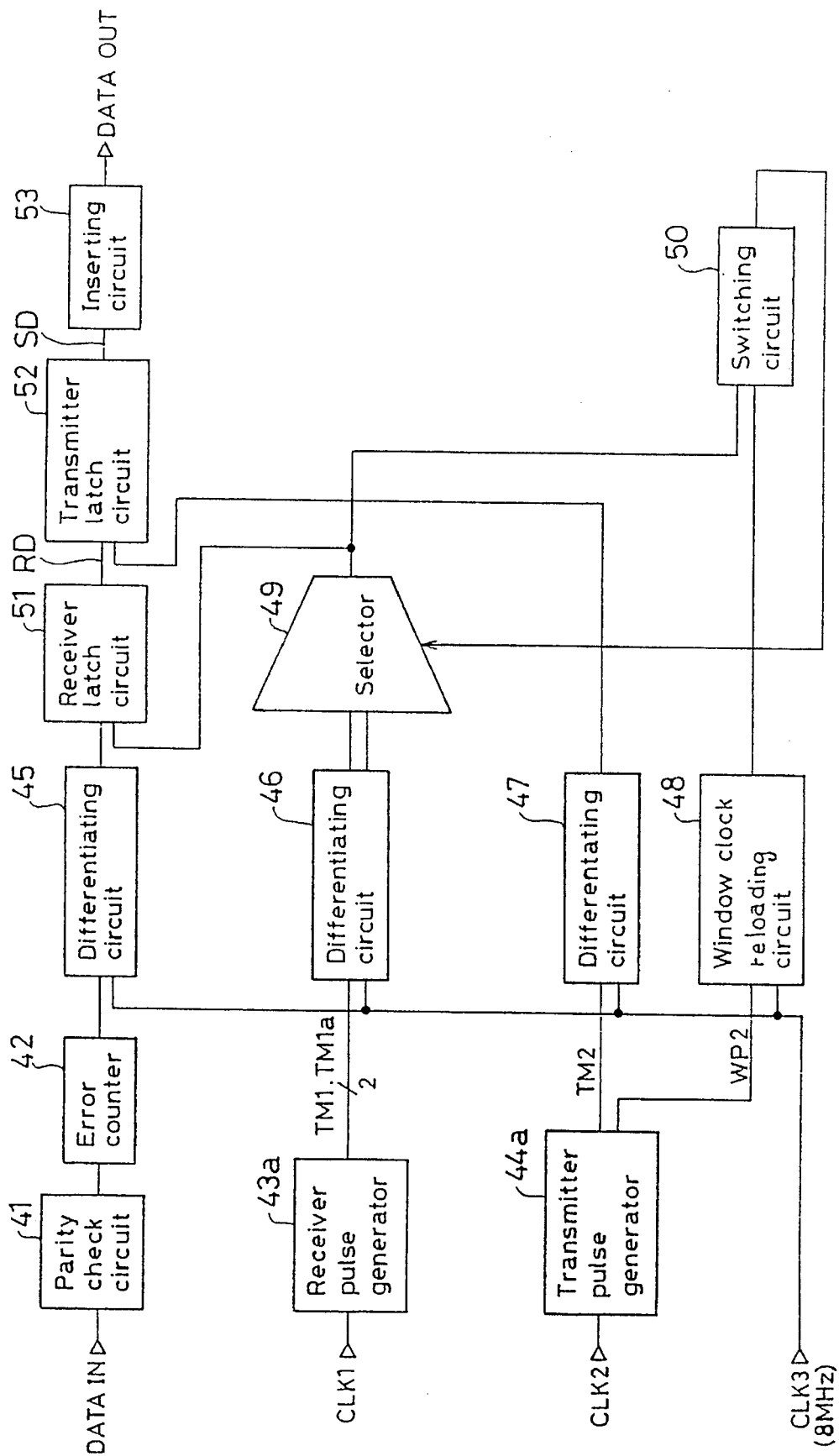
FIG. 11 is a block diagram of a variation of the second embodiment shown in FIG. 8.

FIG. 11 is a modification of the processing circuit 36 shown in FIG. 8. As shown, the processing circuit includes: a receiver pulse generator 43a for generating a timing pulse TM1 having a frame cycle and a timing pulse TM1a having a halfcycle phase offset with respect to the timing pulse TM1 based on the receiver clock CLK1; and a transmitter pulse generator 44a for generating a timing pulse TM2 having the frame cycle and a window pulse WP2 based on the transmitter clock CLK2. The window pulse WP2 has a window (pulse width) having 10 bits before and after the timing pulse TM2. Other circuit elements of FIG. 11 are the same as those shown in FIG. 8, and detailed description thereof will be omitted herein. In FIG. 11, like reference numerals and characters designate like elements.

Referring to FIG. 11, the receiver latch circuit 51 latches the data output from the error counter 42 in synchronization with the timing pulse output from the selector 49, and the transmitter latch circuit 52 latches the data RD output from the receiver latch circuit 51 in synchronization with the timing pulse TM2. The selector 49 switches the output thereof to a different timing pulse at the time when timing overlap between the window pulse WP2 and the timing pulse output from the selector 49 occurs.

Thus, the modification shown in FIG. 11 provides effects similar to those of the second embodiment shown in FIG. 8.

Figure 12:
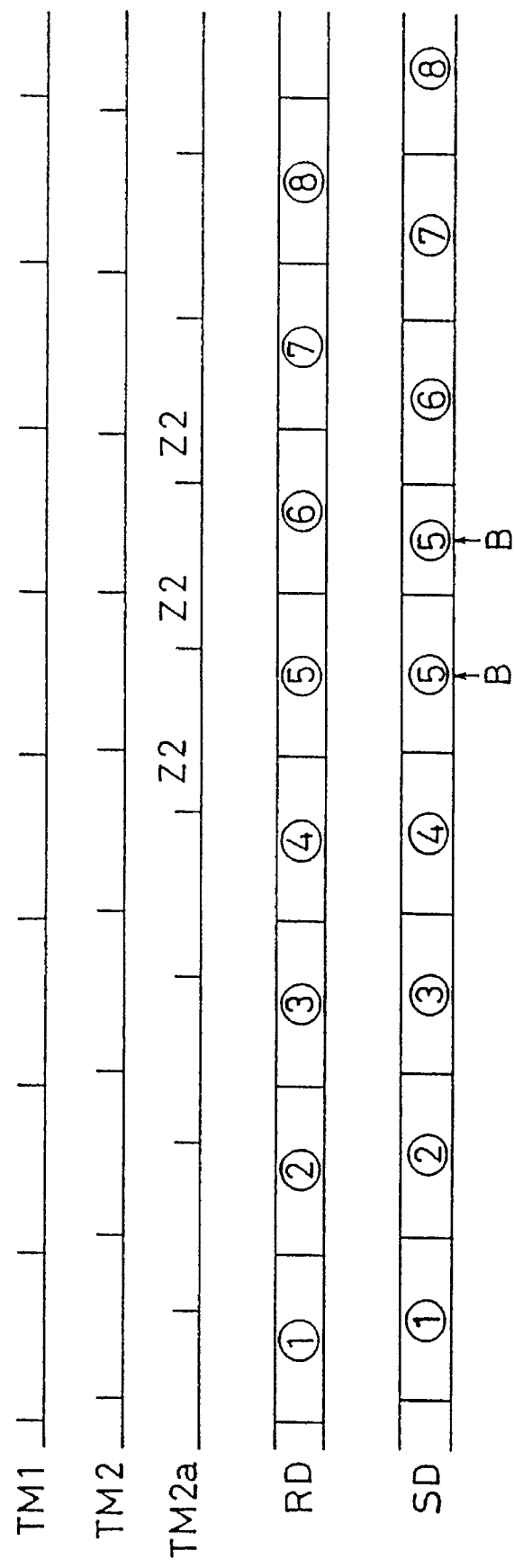
FIGS. 12 and 13 are timing charts for explaining operations in the processing circuit shown in FIG. 8.
Figure 13:
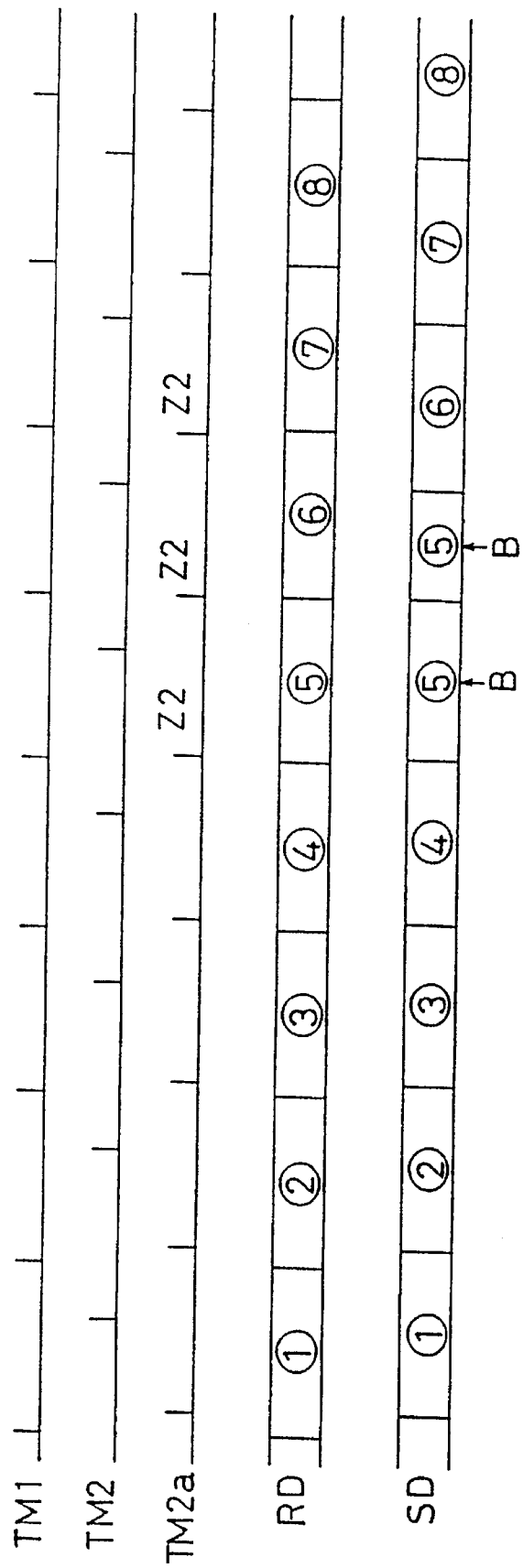

However, the circuit shown in FIG. 8 (or FIG. 9) may suffer the following unfavorable phenomena:

(1) Data insertion into the Z2-byte in a frame fails at the time indicated by the arrow A in FIGS. 9 or 10 when timing overlap between the timing pulse from the selector 49 and the window pulse begins, where the frequency of the clock CLK2 is lower than that of the clock CLK1; and (2) The same data is inserted into the Z2-byte in each of two successive frames at the time indicated by the arrow B in FIGS. 12 or 13 when timing overlap between the timing pulse from the selector 49 and the window pulse begins, where the frequency of the clock CLK2 is higher than that of the clock CLK1.

Figure 14:
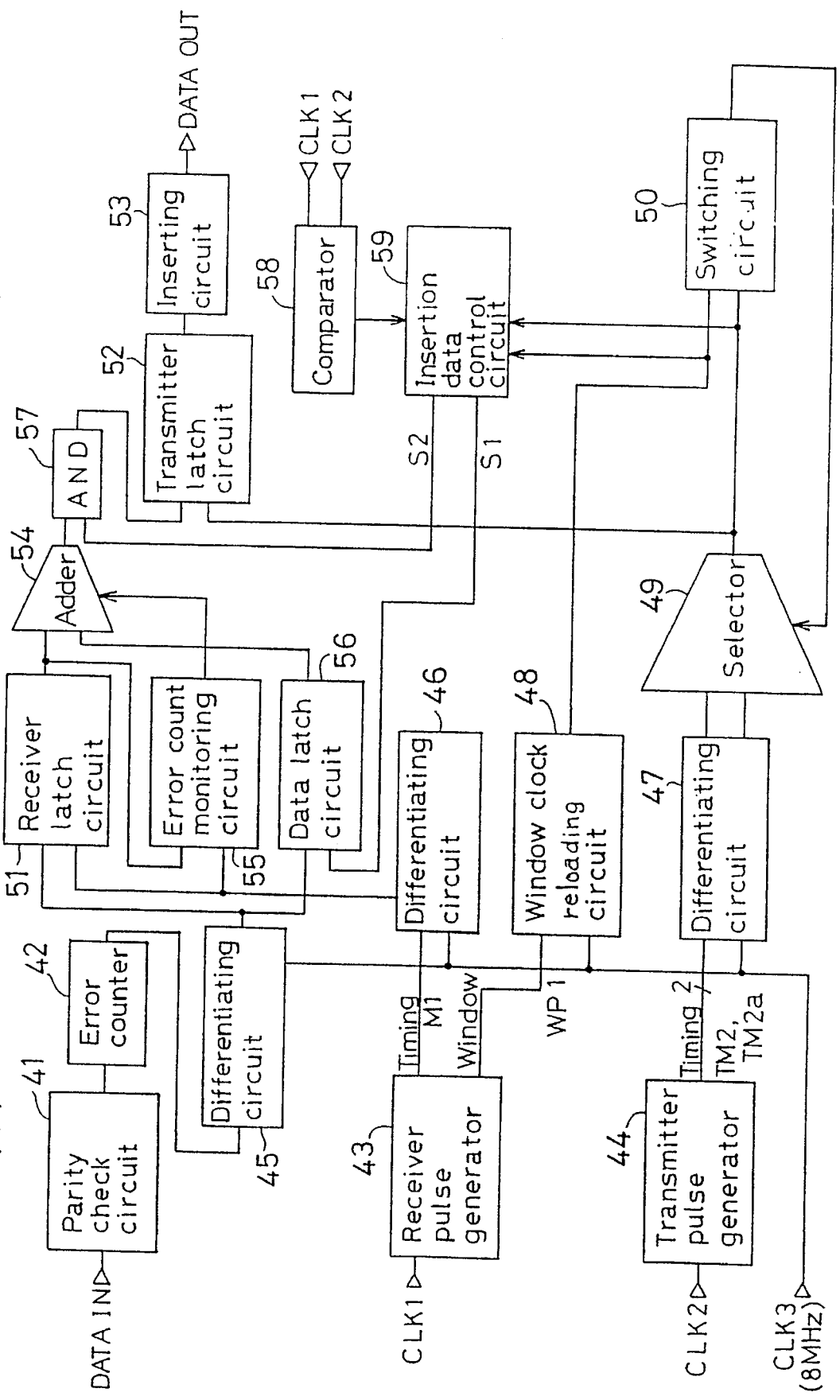
FIG. 14 is a block diagram of another variation of the second embodiment shown in FIG. 8.

To eliminate the aforesaid unfavorable phenomena (1) and (2), certain circuits are added to the processing circuit 36 shown in 8. FIG. 14 is a diagram illustrating such a modified processing circuit.

In FIG. 14, the processing circuit includes: an adder 54; an error count monitoring circuit 55 for monitoring the count of the error counter 42 to cause the adder 54 to perform addition operation when the count is low (e.g., 0 or 1); a data latch circuit 56 for reading data which is dropped from the receiver latch circuit 51 to latch the data when the data insertion failure (the phenomenon (1)) occurs, that is, when the frequency of the clock CLK2 is lower than that of the clock CLK1 and the timing overlap between the timing pulse output from the selector 49 and the window pulse WP1 begins.

The processing circuit further includes: an AND gate 57; a comparing circuit 58 for comparing the frequencies of the clocks CLK1 and CLK2; and an insertion data control circuit 59. The data insertion control circuit 59 receives the output of the comparing circuit 58, the window pulse WP1 and the output of the selector 49 to monitor the occurrence of the aforesaid phenomena (1) and (2). When the phenomenon (1) occurs, the circuit 59 outputs the signal S1 to cause the data latch circuit 56 to latch the data latched by the receiver latch circuit 51. When the phenomenon (2) occurs, the circuit 59 drives the signal S2 (normally high) low to prevent the transmitter latch circuit 52 from repeatedly latching the same data as output from the receiver latch circuit 51. Other parts of the circuit structure shown in FIG. 14 are substantially the same as those shown in FIG. 8, and the detailed description thereof will be omitted herein.

In the circuit of FIG. 14, when the phenomenon (1) (data insertion failure) occurs, the dropped data is once latched by the data latch circuit 56 and added by the adder 54 to subsequent data having a low count detected by the error counter 42. Then, the resultant data is latched by the transmitter latch circuit 52 and inserted into the Z2-byte in the frame to be transmitted by the inserting circuit 53. When the phenomenon (2) occurs or when the same data are latched twice in succession by the transmitter latch circuit 52, then the second data is masked by the AND gate 57, thereby preventing the same data from being inserted into successive frames.

Likewise, the unfavorable phenomena (1) and (2) may occur in the processing circuit shown in FIG. 11, but are prevented by providing thereto the adder 54, the error count monitoring circuit 55, the data latch circuit 56, the AND gate 57, the comparing circuit 58, and the insertion data control circuit 59 shown in FIG. 14.

Thus, the first station 31 can calculate the parity error count per unit time received from the second station 32 without errors in the second embodiment.

The present invention provides for:

(1) Detection of precise line condition between the stations and suitable selection of a clock according to the detected line condition; and (2) Calculation of the parity error count per unit time received from the counter station without errors.

What is claimed is:

1. A digital communication system comprising:

a first station;

a second station; and a network for transmitting predetermined communication frames between the first and second stations, the communication frame including a communication data part for accepting communication data and a control data part for accepting control data, the first station successively transmitting the frames to the second station based on a first clock generated in the first station, the second station evaluating transmission quality of data in the frame received from the first station based on the data in the frame and inserting the evaluated transmission quality into the control data part to successively transmit the frames to the first station based on a second clock generated in the second station, parity check data being inserted into the control data part of each frame transmitted from the first station to the second station, in which the second station comprises:

parity check counting means for performing a parity check on each of the frames received from said first station to output numeric data indicative of a mismatch count;

reception timing generating means for generating a reception timing signal having the same cycle as the frames received from said first station based on said first clock;

transmission timing generating means for generating a transmission timing signal having the same cycle as the frames to be transmitted to the first station based on the second clock;

auxiliary timing generating means for generating an auxiliary timing signal having a half-cycle phase offset with respect to said transmission timing signal;

timing selecting means for selecting either one of the transmission timing signal and the auxiliary timing signal to output the selected timing signal;

receiver latch means for latching the numeric data in synchronization with the reception timing signal;

transmitter latch means for latching the numeric data latched by the receiver latch means in synchronization with the timing signal output from the timing selecting means; and numeric data inserting means for inserting the numeric data latched by the transmitter latch means into the corresponding frame to be transmitted to the first station, the timing selecting means switching a timing signal to be output between the transmission timing signal and the auxiliary timing signal when a phase difference between the reception timing signal and the timing signal output from the timing selecting means is not greater than a predetermined value.

2. A digital communication system as set forth in claim 1, wherein the second station further comprising:

monitoring means for monitoring the insertion of the numeric data into the corresponding frame;

converting means for converting, when identical same numeric data are inserted into two successive frames, the numeric data inserted into one of the two successive frames into numeric data indicative of zero; and adding means for adding, when the numeric data fails to be inserted into the corresponding frame, a value of the numeric data to a value of numeric data inserted into a frame subsequent to the corresponding frame.

3. A digital communication system comprising:

a first station;

a second station; and a network for transmitting predetermined communication frames between the first and second stations, the communication frame including a communication data part for accepting communication data and a control data part for accepting control data, the first station successively transmitting the frames to the second station based on a first clock generated in the first station, the second station evaluating transmission quality of data in the frame received from the first station based on the data in the frame and inserting the evaluated transmission quality into the control data part to successively transmit the frames to the first station based on a second clock generated in the second station, parity check data being inserted into the control data part of each frame transmitted from the first station to the second station, in which the second station comprises:

parity check counting means for performing a parity check on each of the frames received from the first station to output numeric data indicative of a mismatch count;

reception timing generating means for generating a reception timing signal having the same cycle as the frames received from the first station based on the first clock;

auxiliary timing generating means for generating an auxiliary timing signal having a half-cycle phase offset with respect to the reception timing signal;

timing selecting means for selecting either one of the reception timing signal and the auxiliary timing signal to output the selected timing signal;

transmission timing generating means for generating a transmission timing signal having the same cycle as the frames to be transmitted to the first station based on the second clock;

receiver latch means for latching the numeric data in synchronization with the timing signal output from the timing selecting means;

transmitter latch means for latching the numeric data latched by the receiver latch means in synchronization with the transmission timing signal; and numeric data inserting means for inserting the numeric data latched by the transmitter latch means into the corresponding frame to be transmitted to the first station, the timing selecting means switching a timing signal to be output between the reception timing signal and the auxiliary timing signal when a phase difference between the timing signal output from the timing selecting means and the transmission timing signal is not greater than a predetermined value.

4. A digital communication system as set forth in claim 3, wherein the second station further comprising:

monitoring means for monitoring the insertion of the numeric data into the corresponding frame;

converting means for converting, when identical numeric data are inserted into two successive frames, the numeric data inserted into one of the two successive frames into numeric data indicative of zero; and adding means for adding, when the numeric data fails to be inserted into the corresponding frame, a value of the numeric data to a value of numeric data inserted into a frame subsequent to the corresponding frame.

5. A station of a digital communication system with a plurality of stations comprising:

parity check counting means for performing a parity check on frames received from an opposite station to output numeric data indicative of a mismatch count;

reception timing generating means for generating a reception timing signal having the same cycle as the frames received from the opposite station based on a first clock generated by the opposite station;

transmission timing generating means for generating a transmission timing signal having the same cycle as the frames to be transmitted to the opposite station based on a second clock generated by the station;

auxiliary timing generating means for generating an auxiliary timing signal having a half-cycle phase offset with respect to said transmission timing signal;

timing selecting means for selecting either one of the transmission timing signal and the auxiliary timing signal to output the selected timing signal;

receiver latch means for latching the numeric data in synchronization with the reception timing signal;

transmitter latch means for latching the numeric data latched by the receiver latch means in synchronization with the timing signal output from the timing selecting means; and numeric data inserting means for inserting the numeric data latched by the transmitter latch means into the corresponding frame to be transmitted to the opposite station, the timing selecting means switching a timing signal to be output between the transmission timing signal and the auxiliary timing signal when a phase difference between the reception timing signal and the timing signal output from the timing selecting means is not greater than a predetermined value.

6. A station of a digital communication system with a plurality of stations comprising:

parity check counting means for performing a parity check on frames received from an opposite station to output numeric data indicative of a mismatch count;

reception timing generating means for generating a reception timing signal having the same cycle as the frames received from the opposite station based on a first clock generated by the opposite station;

auxiliary timing generating means for generating an auxiliary timing signal having a half-cycle phase offset with respect to the reception timing signal;

timing selecting means for selecting either one of the reception timing signal and the auxiliary timing signal to output the selected timing signal;

transmission timing generating means for generating a transmission timing signal having the same cycle as the frames to be transmitted to the opposite station based on a second clock generated by the station;

receiver latch means for latching the numeric data in synchronization with the timing signal output from the timing selecting means;

transmitter latch means for latching the numeric data latched by the receiver latch means in synchronization with the transmission timing signal; and numeric data inserting means for inserting the numeric data latched by the transmitter latch means into the corresponding frame to be transmitted to the opposite station, the timing selecting means switching a timing signal to be output between the reception timing signal and the auxiliary timing signal when a phase difference between the timing signal output from the timing selecting means and the transmission timing signal is not greater than a predetermined value.

\* \* \* \* \*